United States Patent [19]

Yoshitomi

[11] Patent Number: 4,774,448
[45] Date of Patent: Sep. 27, 1988

[54] REVERSIBLE VARIABLE-SPEED 2-PHASE ELECTRIC MOTOR

[75] Inventor: Kenya Yoshitomi, Nagasaki, Japan

[73] Assignee: Mitsubishi Denki Kabushiki Kaisha, Japan

[21] Appl. No.: 683,581

[22] Filed: Dec. 19, 1984

[30] Foreign Application Priority Data

Dec. 20, 1983 [JP] Japan .................. 58-242632

[51] Int. Cl.⁴ .............................................. A02P 5/40
[52] U.S. Cl. ...................................... 318/746; 318/808
[58] Field of Search .............................. 318/746–748, 318/811, 808

[56] References Cited

U.S. PATENT DOCUMENTS

| | | | |
|---|---|---|---|
| 2,821,639 | 1/1958 | Bright et al. | 318/294 |
| 3,025,445 | 3/1962 | Welch | 318/696 |
| 3,042,847 | 7/1962 | Welch | 318/696 |
| 3,105,180 | 9/1963 | Burnett | 318/747 |
| 3,700,987 | 10/1972 | Deering | 318/748 |
| 3,824,440 | 7/1974 | McIntosh | 318/696 |
| 3,893,012 | 7/1975 | Lin | 318/696 |
| 4,006,391 | 1/1977 | Deering et al. | 318/811 |
| 4,454,454 | 6/1984 | Valentine | 318/293 |

*Primary Examiner*—David Smith, Jr.
*Attorney, Agent, or Firm*—Leydig, Voit & Mayer

[57] ABSTRACT

A reversible variable-speed two-phase motor is disclosed. The motor comprises two sets of stator coils of equal impedance displaced in space by 90 degrees and transistor inverters to provide exciting current to the stator coils. The current supplied to one of the sets of stator coils is 90 degrees out of phase with the current supplied to the other set of stator coils, and the direction of the current in each set of stator coils reverses every 180 degrees so that a smoothly rotating magnetic field is produced. The motor can be operated as an induction motor or as a synchronous motor or as a direct current brake.

1 Claim, 5 Drawing Sheets

FIG. 8

|  | STATE A | STATE B | STATE C | STATE D |
|---|---|---|---|---|
| FORWARD | 21,24,31,34 ON<br>22,23,32,33 OFF | 22,23,31,34 ON<br>21,24,32,33 OFF | 22,23,32,33 ON<br>21,24,31,34 OFF | 21,24,32,33 ON<br>22,23,31,34 OFF |
| REVERSE | 22,23,32,33 ON<br>21,24,31,34 OFF | 21,24,31,34 ON<br>22,23,32,33 OFF | 21,24,31,34 ON<br>22,23,32,33 OFF | 22,23,32,33 ON<br>21,24,31,34 OFF |

REVERSIBLE VARIABLE-SPEED 2-PHASE ELECTRIC MOTOR

BACKGROUND OF THE INVENTION

The present invention relates to a reversible 2-phase electric motor with variable speed control.

In order to perform reversible variable-speed control of electric motors, it is conventional to use a thyristor-controlled brushless motor and a variable-voltage variable-frequency power supply. However, the main circuits and the control circuits of such apparatuses are complicated and costly.

SUMMARY OF THE INVENTION

It is therefore an object of the present invention to provide a reversible 2-phase electric motor with variable speed control which has simple main and control circuits.

It is another object of the present invention to provide a reversible variable-speed 2-phase electric motor which has a high power factor and high efficiency.

It is yet another object of the present invention to provide a reversible variable-speed 2-phase electric motor which can be cheaply manufactured.

These objects are achieved by providing a 2-phase electric motor with 2 sets of stator coils of equal impedance separated by 90 degrees in space and inverter means for exciting the stator coils so that the direction of the current flowing through each set of stator coils reverses every 180 degrees and so that the current flowing through one of the sets of stator coils is 90 electrical degrees out of phase with the current flowing through the other pair of stator coils.

Accordingly, a reversible variable-speed 2-phase electric motor according to the present invention comprises a rotor; a stator surrounding said rotor; two sets of stator coils, both sets of stator coils having the same electrical impedance, each set of stator coils being displaced 90 degrees in space with respect to the other set of stator coils; converter means for converting 3-phase AC power to DC power; a control circuit including means for providing a signal indicative of a certain speed, the speed signal providing means including means coupled to the three-phase AC power for providing a signal indicative of the AC current, a speed setting circuit for providing a signal indicative of a desired motor speed, means for producing an output signal indicative of the difference between the AC current signal and the desired speed signal, and means responsive to the difference signal for converting the difference signal to a signal having a frequency which corresponds to the magnitude of the difference signal, the control circuit further including pulse generating circuitry that provides control signals, the pulse generating circuitry including means responsive to the speed signal for providing first and second output pulses which are 180 degrees out of phase with one another, first and second pulse generating circuits, and means for supplying the first and second output pulses to the first and second pulse generating circuits, wherein the frequency signal is input to the first and second output pulse providing means as the signal indicative of a certain speed and wherein the first and second output pulse providing means include counter means for receiving as a clock signal the signal indicative of a certain speed and providing a reduced frequency signal and flip-flop means for receiving the reduced frequency signal as a clock signal and supplying the first and second output pulses to the first and second pulse generating circuits, respectively; inverter means associated with each of said sets of stator coils and connected across the outputs of said converter means for providing current to said sets of stator coils in response to the control signals from said control circuit so that the direction of current in each set periodically reverses, said periodic reversal of the direction of current in one of said sets of stator coils being 90 degrees out of phase with the reversal of current provided to said other set of stator coils, wherein the inverter means includes first and second inverters respectively associated with the two sets of stator coils and wherein the first and second pulse generating circuits are respectively associated with the first and second inverters; and a switch means for reversing the connections between at least one of said inverter means and the associated pulse generating circuit which delivers said control circuits to the inverter means in response to a command signal so as to cause said rotor to reverse its rotational direction by shifting the periodic reversal current in one set of stator coils by 180 electric degrees the directions of the current supplied to each set of stator coils reversing every 180 electrical degrees, and the current supplied by the inverter means to one of the sets of stator coils being 90 degrees out of phase with the current supplied to the other set of stator coils.

BRIEF DESCRIPTION OF THE DRAWINGS

FIG. 8 is a schematic view showing the direction of the resultant magnetic field at various states during forward and reverse operation in a 2-phase motor according to the present invention.

DESCRIPTION OF THE PREFERRED EMBODIMENT

An embodiment of a 2-phase motor according to the present invention will now be described while referring to FIGS. 1 through 6 of the attached drawings.

Figure 1:
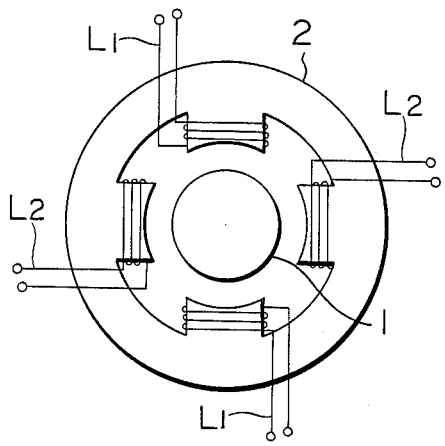
FIG. 1 is a schematic illustration of the rotor and stator arrangement of a 2-phase motor according to the present invention.

FIG. 1 is a schematic illustration of the rotor and stator of a 2-phase motor according to the present invention in which element number 1 is a squirrel-cage rotor, element number 2 is a stator, and elements L1 and L2 are two sets of stator coils of equal impedance. Although the stator is shown as being of the salient-pole type, it need not be of that type. As can be seen from the figure, the first set of stator coils L1 and the second set L2 are disposed so as to be separated from one another by 90 degrees. Although the connection is not shown, the two portions of the first set of stator coils L1 on either side of the stator 2 are connected with one another in series, and the two portions of the second set of stator coils L2 on either side of the stator 2 are also connected in series.

Figure 2:
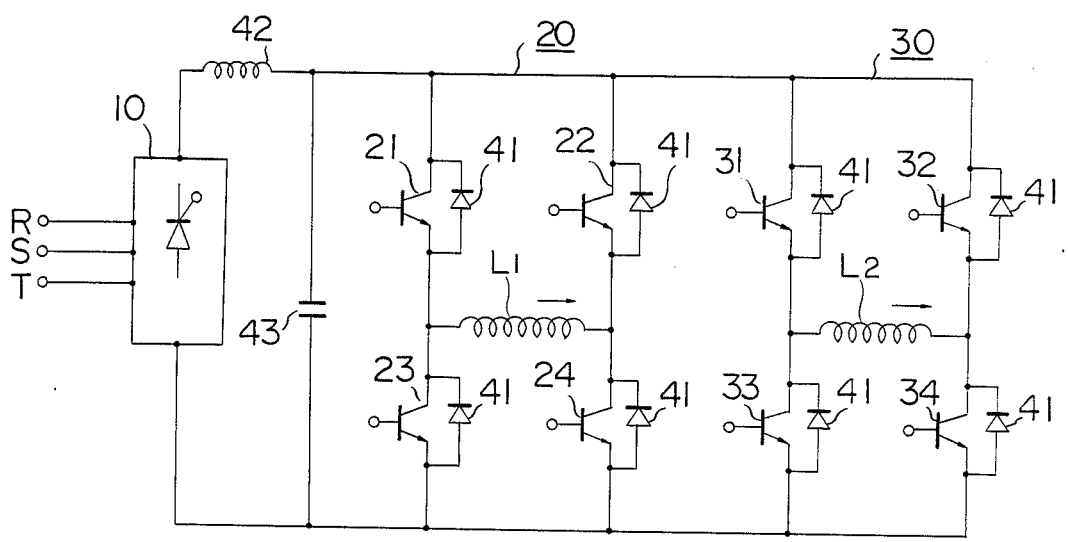
FIG. 2 is a schematic diagram of the main circuit of a 2-phase motor according to the present invention.

In FIG. 2 is shown the main circuit of a 2-phase motor according to the present invention. In the figure, element number 10 is a conventional 3-phase hybrid converter connected to a 3-phase power supply, indicated by the 3 input leads R, S, and T. Elements L1 and L2 are the previously described first and second set of stator coils of equal impedance. Element number 20 is a first inverter means for supplying current to the first set of stator coils L1, and element number 30 is a second inverter means for supplying current to the second set of stator coils L2, both connected in parallel with converter 10. Inverter means 20 comprises a 4-transistor bridge made of transistors 21 through 24 with a diode 41 connected between the collector and emitter of each of the transistors 21-24. As shown in the drawing, the collectors of transistors 21 and 22 are connected to the positive terminal of the converter 10, the emitters of transistors 23 and 24 are connected to the negative terminal of the converter 10, the emitters of transistors 21 and 22 are respectively connected to the collectors of transistors 23 and 24, and the first set of stator coils L1 is connected between the emitter of transistor 21 and the emitter of transistor 22. The second inverter means 30 has an identical structure, comprising a 4-transistor bridge made of transistors 31-34 with a diode 41 connected between the collector and emitter of each transistor 31-34 and with the second set of stator coils L2 connected between the emitters of transistors 31 and 32. Element number 42 is a DC reactor connected in series with the converter 10, and element number 43 is a smoothing capacitor connected across the terminals of the converter 10.

Figure 3:
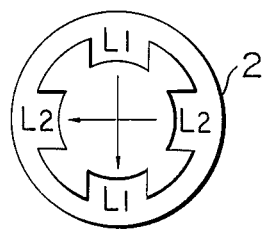
FIG. 3 is a schematic view of the stator of a 2-phase motor according to the present invention illustrating the position of the stator coils and the direction of the resulting magnetic fields produced by the stator coils when the currents flowing through the stator coils are as shown by the arrows in FIG. 2.

FIG. 3 shows schematically the disposition of the stator coils L1 and L2 in the stator of a 2-phase motor according to the resent invention. The arrows in FIG. 3 show the directions of the magnetic fields produced when the directions of the stator currents are as shown by the arrows in FIG. 2.

Figure 4:
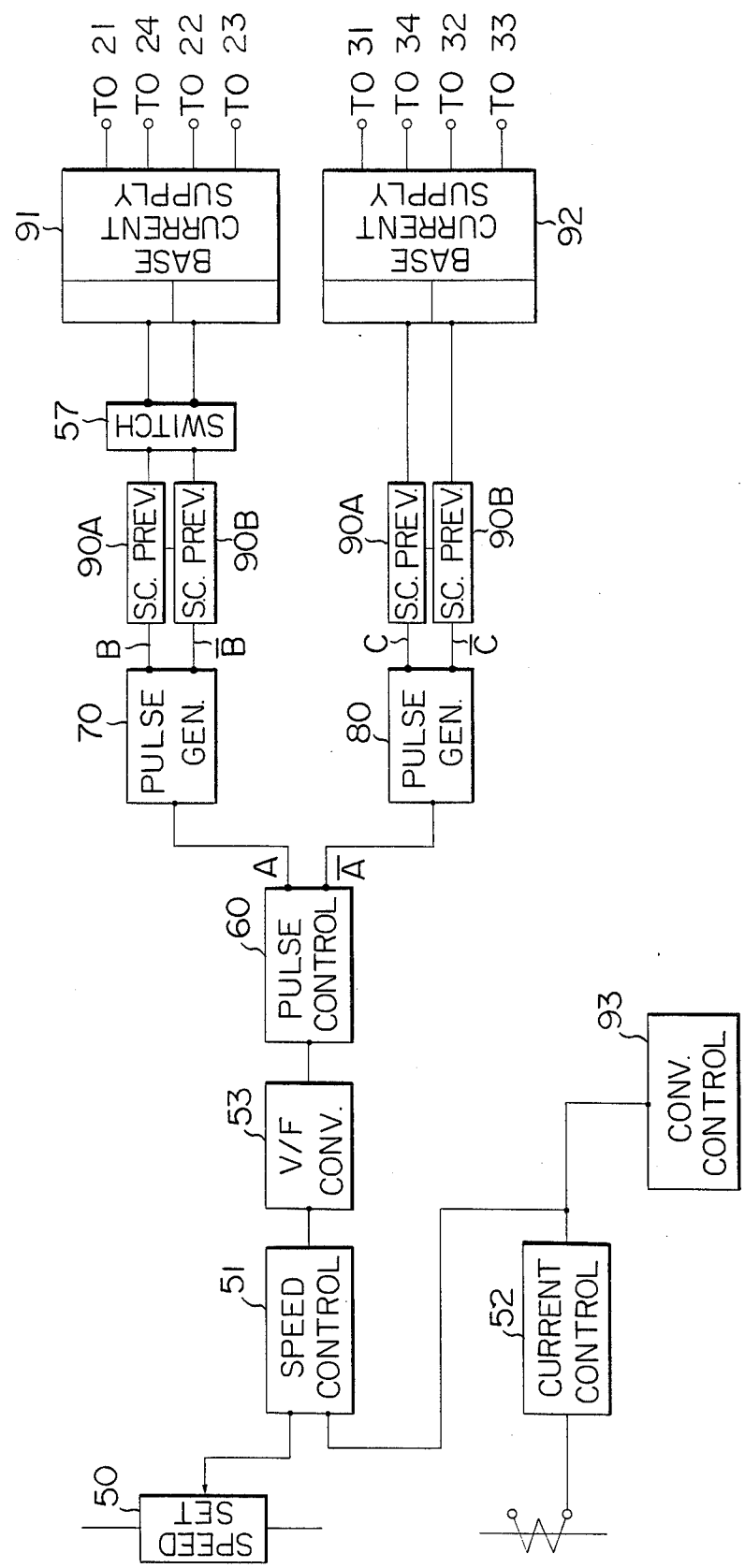
FIG. 4 is a schematic diagram of one example of a control circuit for a 2-phase motor according to the present invention.

FIG. 4 shows an example of a control circuit for a 2-phase motor according to the present invention. In this figure, element number 50 is a conventional speed setting circuit, such as a potentiometer connected between a reference voltage and ground, which provides an adjustable output voltage as a speed setting signal to a conventional speed control circuit 51. Element number 52 is a conventional current control circuit which measures the input current on the AC side of converter 10 and produces an output signal having a voltage proportional to the measured current. Normally, when the current measured by the current control circuit 52 is below rated current, the output of the current control circuit 52 is zero volts. However, when the measured current exceeds the rated current, the output voltage increases linearly in proportion to the measured current. The output voltage from the current control circuit 52 is provided as an input signal to the speed control circuit 51 and to a converter control circuit 93 which controls the gates of the thyristors in the converter 10 of FIG. 2. The speed control circuit 51 provides an output voltage which is proportional to the difference between the output voltage of the current control circuit 52 and the output voltage of the speed setting circuit 50.

Element number 53 is a conventional voltage-to-frequency converter which receives the output voltage of the speed control circuit 51 as an input signal and produces an output signal having a frequency, in the kilohertz range, which is proportional to the voltage of the output signal of the speed control circuit 51. Element number 60 is a pulse control circuit which receives as a clock signal the output of the voltage-to-frequency converter 53 and produces output pulses A and $\overline{A}$ which are 180 degrees out of phase with one another. Element number 70 is a pulse generator which receives output signal A from the pulse control circuit 60 as a clock signal and produces output signals B and $\overline{B}$, which are 180 degrees out of phase with one another.

Element number 80 is also a pulse generator which receives output signal $\overline{A}$ from the pulse control circuit 60 as a clock signal and produces output signals C and $\overline{C}$, which are 180 degrees out of phase with one another. Elements number 90A are conventional short circuit prevention circuits respectively connected to outputs B and C of pulse generators 70 and 80, while elements number 90B are also short circuit prevention circuits connected to outputs $\overline{B}$ and $\overline{C}$ of pulse generators 70 and 80. The short circuit prevention circuits produce a short time delay (40 microseconds, for example) in any of signals B, $\overline{B}$, C, or $\overline{C}$ when that signal is going from a low to a high level, thus preventing a short circuit between transistors of the inverters 20 and 30 when the transistors are turned on.

Figure 5:
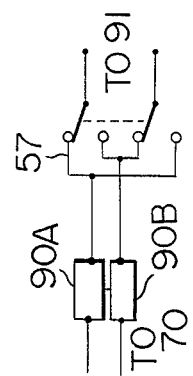
FIG. 5 is a schematic diagram of the switching circuit in the control circuit of FIG. 4.

Element number 57 is a switching circuit for changing the direction of operation of the motor from forward to reverse, an example of which is shown in FIG. 5. The switching circuit 57 can be simply a double-pole double-throw switch, one pair of whose terminals is connected to output B of pulse generator 70 via short circuit prevention circuit 90A, and another pair of whose terminals is connected to output $\overline{B}$ of pulse generator 70 via short circuit prevention circuit 90B, with the remaining two terminals each being connected to one of the two input leads of a first base current supply circuit 91. The first base current supply circuit 91 supplies base current to the transistors 21-24 of the first inverter means 20. The first base current supply circuit 91 has two input leads, the first of which receives signal B and the second of which receives signal $\overline{B}$ from pulse generator 70, or vice versa, depending upon whether forward or reverse operation is being carried out. The first base current supply circuit 91 also has 4 output leads, each of which is connected to the base of one of the 4 transistors 21-24 in the first inverter means 20. The first base current supply circuit 91 drives transistors 21 nd 24 only when the input signal applied to the first input lead is high, and it drives transistors 22 and 23 only when the input signal applied to its second input lead is high. Element 92 is a second base current supply circuit identical to the first current supply circuit 91 except that its two input leads receive signals C and $\overline{C}$, respectively, as input signals during both forward and reverse operation. Each of its 4 output leads is connected to the base of one of transistors 31-34. Circuit 92 drives transistors 31 and 34 only when output signal C is high and drives transistors 32 and 33 only when output signal $\overline{C}$ is high.

Figure 6:
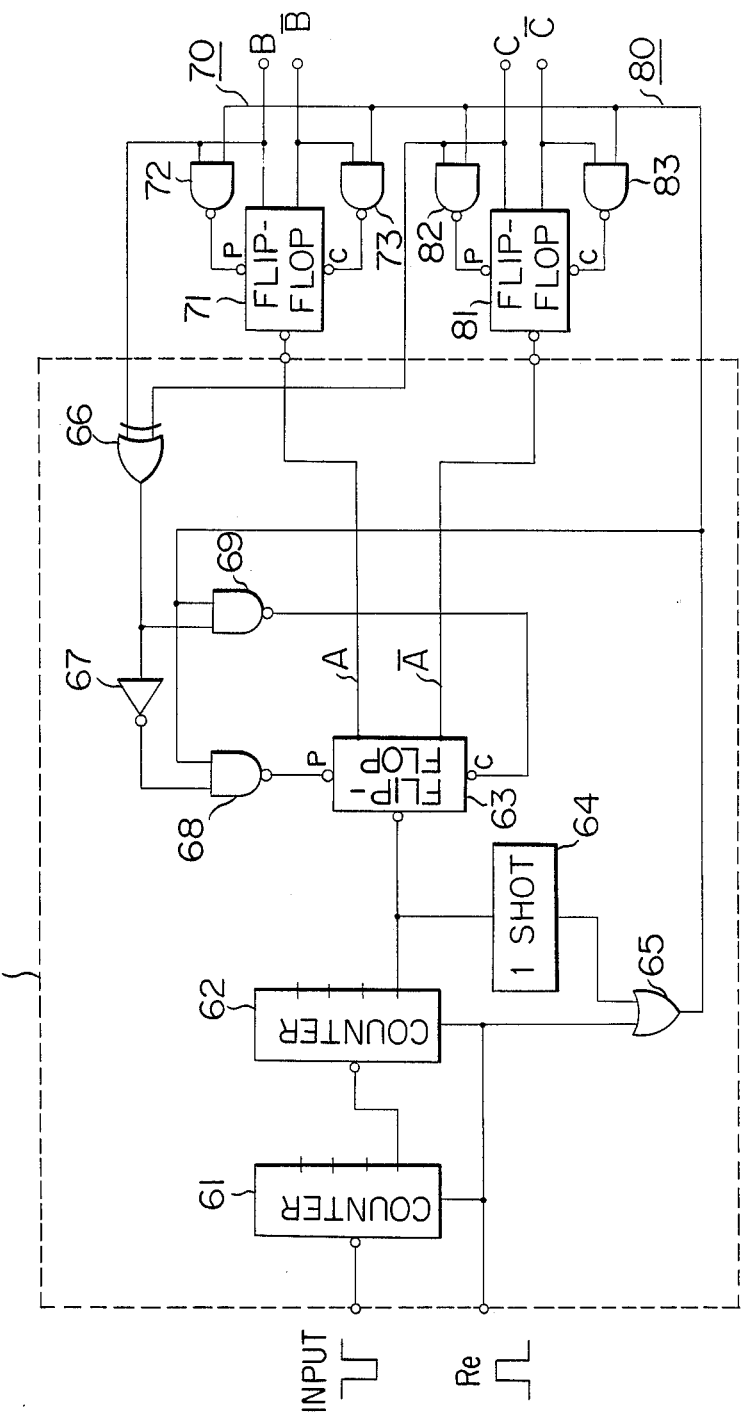
FIG. 6 is a schematic diagram of one example of a pulse control circuit for the control circuit of FIG. 4.

The structure of the pulse control circuit 60 and the pulse generators 70 and 80 is shown in detail in FIG. 6.

In this figure, element number 61 is a divide-by-eight counter which receives as a clock signal the output signal from the voltage-to-frequency converter 53 of FIG. 4. Element number 62 is also a divide-by-eight counter which receives as a clock signal the output signal from the first divide-by-eight counter 61. These two counters 61 and 62 therefore constitute a divide-by-64 counter. Element number 63 is a falling edge-triggered type T flip-flop which receives the output of divide-by-eight counter 62 as a clock signal. Element number 64 is a rising edge-triggered one-shot multivibrator which receives the output from divide-by-eight counter 62 as a trigger pulse. Element number 65 is an OR gate which receives as input a reset signal Re produced by suitable means (not shown) and the output from the one-shot 64. Element number 66 is an EXCLUSIVE OR gate. Element number 67 is an inverter, the input of which is connected to the output of EXCLUSIVE OR gate 66. Elements number 68 and 69 are NAND gates, the outputs of which are connected to the preset input P and the clear input C, respectively, of flip-flop 63. The two inputs of NAND gate 68 are connected to the output of inverter 67 and OR gate 65, respectively, and the two inputs of NAND gate 69 are connected to the output of EXCLUSIVE OR gate 66 and OR gate 65, respectively.

Also in FIG. 6, elements number 71 and 81 are falling edge-triggered type T flip-flops which respectively receive the output signals A and $\overline{A}$ of flip-flop 63 as clock signals. Elements number 72, 73, 82, and 83 are NAND gates. The 2 inputs of NAND gate 72 are respectively connected to the output of OR gate 65 and output B of flip-flop 71. The 2 inputs of NAND gate 73 are respectively connected to the output of OR gate 65 and output $\overline{B}$ of flip-flop 71. The 2 inputs of NAND gate 82 are respectively connected to the output of OR gate 65 and output C of flip-flop 81, and the 2 inputs of NAND gate 83 are respectively connected to the output of OR gate 65 and output $\overline{C}$ of flip-flop 81. The outputs of these 4 NAND gates 72, 73, 82, and 83 are respectively provided to the present input P of flip-flop 71, the clear input C of flip-flop 71, the preset input P of flip-flop 81, and the clear input C of flip-flop 81. Furthermore, output B of flip-flop 71 and output C of flip-flop 81 are provided as the 2 inputs of the above-mentioned EXCLUSIVE OR gate 66.

The operation of the motor illustrated in FIGS. 1 through 6 will now be explained. In brief, the motor is constructed such that the inverters 20 and 30 provide currents to the stator coils L1 and L2 which are 90 electrical degrees out of phase with one another, the directions of the currents reversing every 180 electrical degrees. This produces a smoothly rotating resultant magnetic field whose direction of rotation can be easily controlled.

During operation, speed control circuit 51 produces an output signal the voltage of which is proportional to the difference between the voltage of the signal from the speed setting circuit 50 and current control circuit 52. The output voltage of the speed control circuit 51 is converted to a signal having a frequency in the kilohertz range by voltage-to-frequency converter 53, and this is provided to the pulse control circuit 60 as a clock signal.

When the current measured by the current control circuit 52 is below rated current, the output of the current control circuit 52 is 0 volts and the output of the speed control circuit 51 and thus the speed of the motor is dependent only on the level of the output of the speed setting circuit 50, indicating the desired motor speed. However, if the measured current exceeds the rated current such as during start-up of the motor, the current control circuit 52 produces an output voltage linearly proportional to the measured current; the difference between the signal from the speed setting circuit 50 and the signal from the current control circuit 52 decreases, and the output voltage of the speed control circuit 51 decreases accordingly. The decreased output voltage of the speed control circuit 51 produces a decrease in the frequency of the output signal from the voltage-to-frequency converter 53, which produces a decrease in the speed of the motor.

The frequency of the output signal of the voltage-to-frequency converter 53 is divided by 64 by the divide-by-eight counters 61 and 62 to which it is provided as a clock signal. The output signal of counter 62 is provided as a clock signal to flip-flop 63 which produces output signals A and $\overline{A}$ in the hertz range (1/128 of the frequency of the input signal from the voltage-to-frequency converter 53), signal a being 180 degrees out of phase with respect to $\overline{A}$. Signal A is applied as a clock signal to flip-flop 71 which produces output signal B and output signal $\overline{B}$ which is 180 degrees out of phase with respect to signal B. Signal $\overline{A}$ is applied as a clock signal to flip-flop 81 which produces output signal C and output signal $\overline{C}$ which is 180 degrees out of phase with respect to C.

Signals B and $\overline{B}$ are provided to base current supply circuit 91 via short circuit prevention circuits 90A and 90B and switch 57, the short circuit prevention circuits producing the previously-described time delays in signals B and $\overline{B}$ when either signal goes from a low to a high level. Base current supply circuit 91 then turns on transistors 21 and 24 or 22 and 23 so that DC current, which was converted from 3-phase AC power by converter 10, flows from converter 10 through the first set of stator coils L1 in the direction shown by the arrow in FIG. 2 (when transistors 21 and 24 are on) or in the opposite direction (when transistors 22 and 23 are on). Similarly, signals C and $\overline{C}$ are provided to base current supply circuit 92 via short circuit prevention circuits 90A and 90B. Base current supply circuit 92 turns on transistors 31 and 34 when signal C goes high and turns on transistors 32 and 33 when signal $\overline{C}$ goes high. Thus, current from the converter 10 flows through the second set of stator coils L2 in the direction shown by the arrow in FIG. 2 when signal C is high and in the opposite direction when signal $\overline{C}$ is high.

Each time the output signal of counter 62 goes high, one-shot multivibrator 64 produces a high pulse which is provided to NAND gates 68, 69, 72, 73, 82, and 83. This pulse causes flip-flop 63 to be preset if outputs B and C of flip-flops 71 and 81 have different levels when this high pulse is produced, and it causes flip-flop 63 to be cleared if outputs B and C have the same level. NAND gates 72, 73, 82, and 83 cause the output levels of flip-flops 71 and 81 to be unaltered by any change in the levels of output signals A and $\overline{A}$ due to the clearing and presetting of flip-flop 63 by the pulse from one-shot 64. Similarly, flip-flop 63 is cleared or preset in the same manner when a reset pulse are is issued.

With this structure, the levels of signals B and $\overline{B}$ reverse every 180 electrical degrees each time signal A becomes 0, and the levels of signals C and $\overline{C}$ reverse every 180 electrical degrees each time signal $\overline{A}$ becomes 0. Furthermore, signal C is 90 degrees out of phase with signal B, and signal $\overline{C}$ is 90 degrees out of phase with signal $\overline{B}$.

During forward operation, when the switch 57 is in the state shown in FIG. 5, signal B controls the base currents of transistors 21 and 24, signal $\overline{B}$ controls the base currents of transistors 22 and 23, signal C controls the base currents of transistors 31 and 34, and signal $\overline{C}$ controls the base currents of transistors 32 and 33 via the base current supply circuits 91 and 92. During reverse operation, signals C and $\overline{C}$ control the same transistors as during forward operation, while signal B controls transistors 22 and 23 and signal $\overline{B}$ controls transistors 21 and 24 by the changing of the switch 57 to the opposite state of that shown in FIG. 5.

Figure 7:
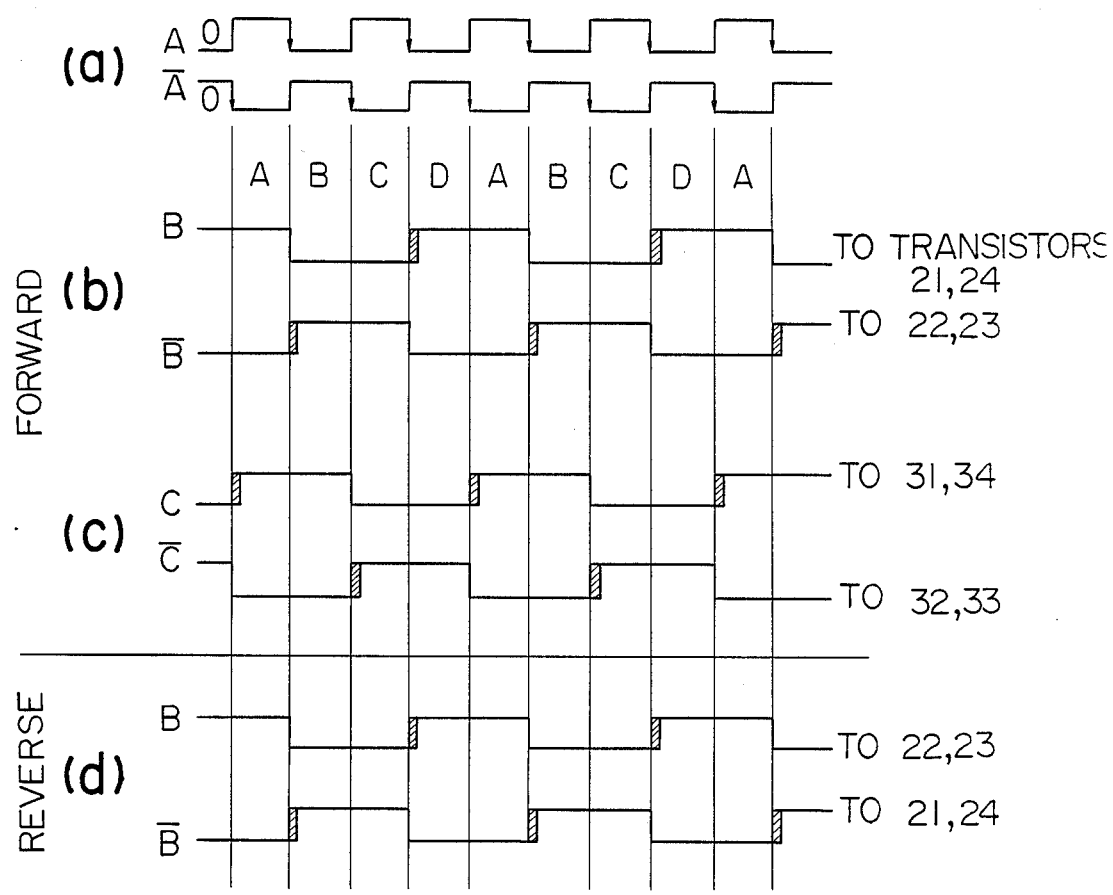
FIG. 7 shows the states of the input signals to the inverter in FIG. 2 during forward and reverse operation of a 2-phase motor according to the present invention.

FIG. 7 shows the levels of signal B, $\overline{B}$, C, and $\overline{C}$ which are applied to the base current supply circuits 91 and 92 during the 4 different states (States A through D) of forward and reverse operation. In the figure, (a) indicates the levels of signals A and $\overline{A}$, (b) and (d) indicate the levels of signal B and $\overline{B}$, and (c) indicates the levels of signals C and $\overline{C}$. At the right side of the figure are shown which transistors are driven by these signals via the base current supply circuits 91 and 92. In State A, signals B and C are high, while $\overline{B}$ and $\overline{C}$ are low. In the subsequent State B, signals $\overline{B}$ and C are high while B and $\overline{C}$ are low. In the subsequent State C, signals $\overline{B}$ and $\overline{C}$ are high while B and C are low, and in State D, signals B and $\overline{C}$ are high while $\overline{B}$ and C are low. The hatched areas in the leading edge portions of each of the pulses represent the short time delays produced by the short circuit prevention circuits 90A and 90B, as described previously.

Accordingly in States A through D of forward operation, the direction of the resultant magnetic field produced by the stator coils L1 and L2 is as shown in FIG. 8. In state A, transistors 21, 24, 31, and 34 are on while the other transistors are off. In State B of forward operations, transistors 22, 23, 31, and 34 are on while the other transistors are off; the direction of the current flowing through the first set of stator coils L1 is opposite to its direction during State A, and the direction of the resulting magnetic field is rotated 90 degrees in the clockwise direction from its direction in State A. In State C of forward operation, transistors 22, 23, 32, and 33 are on while the other transistors are off, and the direction of the resulting magnetic field is again rotated 90 degrees clockwise from its direction in the previous state. In State D of forward operation, transistors 21, 24, 32, and 33 are on while the other transistors are off, with the result that the direction of the resulting magnetic field is rotated clockwise 90 degrees with respect to State D. After State D, State A again occurs, and the resultant magnetic field continues to rotate clockwise, changing its direction by 90 degrees in the clockwise direction at each change of state.

At each change of state, the magnetic field produced by one of the sets of stator coils is reversed, while the magnetic field produced by the other set is held constant. Therefore, at 45 degrees between stator coils, a magnetic field exists, and the rotation of the field is smooth.

During State A of reverse operation, when the switch 57 is in the state opposite of that shown in FIG. 5, transistors 22, 23, 31, and 34 are turned on while the other transistors are turned off. In State B of reverse operation, transistors 21, 24, 31, and 34 are turned on while the other transistors are turned off. In State C of reverse operation, transistors 21, 24, 32, and 33 are turned on while the other transistors are turned off, and in State D of reverse operation, transistors 22, 23, 32, and 33 are turned on while the other transistors are turned off. Thus, as shown in the bottom half of FIG. 8, the resultant magnetic field produced by the stator coils changes its direction by 90 degrees in the counterclockwise direction at each change of state so that a magnetic field smoothly rotating in the counterclockwise direction is produced.

It can be seen that a change from forward to reverse operation is easily achieved by operation of the switch 57 so that the drive signals which were applied to transistors 21 and 24 during forward operation are instead applied to transistors 22 and 23 and vice versa.

The counter electromotive force produced at the time of a change in the direction of the current in the stator coils L1 and L2, the power factor, and the efficiency of the motor described above will now be explained.

At the time of reversal of the direction of the currents flowing through the stator windings L1 and L2, counter electromotive forces develop. For example, at the time of switching from State A to State B, a counter electromotive force develops in stator coil L1, the value of which is given by the following equation.

$$e = -L \times dI/dt \qquad (1)$$

in which L is the inductance of stator coil L1 and I is the current flowing through it.

When the value of e is such that the following inequality holds, $$|e| > E + 2e_D \qquad (2)$$

wherein E is the voltage between the collector of transistor 22 and the emitter of transistor 23, i.e., the voltage across the converter 10, and $e_D$ is the voltage drop across the diodes 41, then a current produced by the counter electromotive force flows through the diodes 41 connected in parallel to transistors 22 and 23 and flows into winding L2.

Furthermore, at this time, the collector-emitter voltage of transistor 22 and transistor 23 is $-e_D$, so that even though base currents flow, neither of the transistors conducts. Both transistors conduct when the following inequality holds:

$$|e| < E + 2e_D \qquad (3)$$

Similarly, when the direction of the current flowing through stator coils L2 is reversed, a current is caused to flow into stator coils L1 by the counter electromotive force induced in stator coils L2. Since the direction of this current flowing into a winding at the time of reversal of the current in the other winding is such that it increases the magnetic field of the winding into which it flows, it produces an increase in the power factor and the efficiency.

The rate of rotation of the field $N_F$ of a 2-phase motor according to the present invention is given by the following equation:

$$N_F = 120 f/P \qquad (4)$$

wherein f is the frequency of the pulses A and $\overline{A}$ and P is the number of poles.

Furthermore, the rate of rotation of the rotor $N_R$ is given by the following equation in which s is the percent slip:

$$N_R = N_F(1-s) \qquad (5)$$

Thus, the rate of rotation of the rotor $N_R$ is that for an induction machine.

Although in the above embodiment, stator coils L1 and L2 are connected in the same manner as in a capacitor motor, since the coils L1 and L2 have the same impedance, the manufacture of the motor is simpler than for a capacitor motor.

Furthermore, since the control circuit illustrated in FIG. 6 employs flip-flops to create control pulses, its construction and operation are extremely simple.

Although the above description was made with respect to a squirrel-cage induction motor, it is obvious that if a salient-pole rotor is used, a 2-phase synchronous motor providing the above effects can be achieved.

The present invention can be operated not only as a motor; by supplying a constant excitation to the stator coils, the present invention can also be operated as a direct current brake.

What is claimed is:

1. A reversible variable-speed 2-phase motor comprising:
    a rotor;
    a stator surrounding said rotor;
    two sets of stator coils having the same electrical impedance, each set of said stator coils being displaced 90 degrees in space with respect to the other set of stator coils;
    converter means for converting 3-phase AC power to DC power;
    a control circuit including means for providing a signal indicative of a certain speed, the speed signal providing means including means coupled to a 3-phase AC power for providing a signal indicative of the AC current, a speed setting circuit for providing a signal indicative of a desired motor speed, means for producing an output signal indicative of the difference between the AC current signal and the desired speed signal, and means responsive to the difference signal for converting the difference signal to a signal having a frequency which corresponds to the magnitude of the difference signal, the control circuit further including pulse generating circuitry that provides control signals, the pulse generating circuitry including means responsive to the speed signal for providing first and second output pulses which are 180 degrees out of phase with one another, first and second pulse generating circuits, and means for supplying the first and second output pulses to the first and second pulse generating circuits, wherein the frequency signal is input to the first and second output pulse providing means as the signal indicative of a certain speed and wherein the first and second output pulse providing means include counter means for receiving as a clock signal the signal indicative of a certain speed and providing a reduced frequency signal and flip-flop means for receiving the reduced frequency signal as a clock signal and supplying the first and second output pulses to the first and second pulse generating circuits, respectively;
    inverter means associated with each of said sets of stator coils and connected across the outputs of said converter means for providing current to said sets of stator coils in response to the control signals from said control circuit so that the direction of current in each set periodically reverses, said periodic reversal of the direction of current in one of said sets of stator coils being 90 degrees out of phase with the reversal of current provided to said other set of stator coils, wherein the inverter means includes first and second inverters respectively associated with the two sets of stator coils and wherein the first and second pulse generating circuits are respectively associated with the first and second inverters; and
    a switch means for reversing the connections between at least one of said inverter means and the associated pulse generating circuit which delivers said control signals to the inverter means in response to a command signal so as to cause said rotor to reverse its rotational direction by shifting the periodic reversal of current in one set of stator coils by 180 electrical degrees.

* * * * *